No. 778,977. PATENTED JAN. 3, 1905.
O. A. JOHNSON.
PITMAN COUPLING.
APPLICATION FILED APR. 12, 1904.

*Fig. 4.* *Fig. 5.*

Witnesses.
A. H. Opsahl.
E. W. Jeppesen.

Inventor
Olof. A. Johnson.
By his Attorneys
Williamson Merchant

No. 778,977. Patented January 3, 1905.

UNITED STATES PATENT OFFICE.

OLOF A. JOHNSON, OF MINNEAPOLIS, MINNESOTA, ASSIGNOR OF ONE-HALF TO NAPOLEON B. JOHNSON, OF MINNEAPOLIS, MINNESOTA.

PITMAN-COUPLING.

SPECIFICATION forming part of Letters Patent No. 778,977, dated January 3, 1905.

Application filed April 12, 1904. Serial No. 202,721.

*To all whom it may concern:*

Be it known that I, OLOF A. JOHNSON, a citizen of the United States, residing at Minneapolis, in the county of Hennepin and State of Minnesota, have invented certain new and useful Improvements in Pitman-Couplings; and I do hereby declare the following to be a full, clear, and exact description of the invention, such as will enable others skilled in the art to which it appertains to make and use the same.

My invention has for its object to provide an improved pitman head or coupling which is adapted to automatically take up all play from wear; and to such ends it consists of the novel devices and combination of devices hereinafter described, and defined in the claims.

Figure 1:
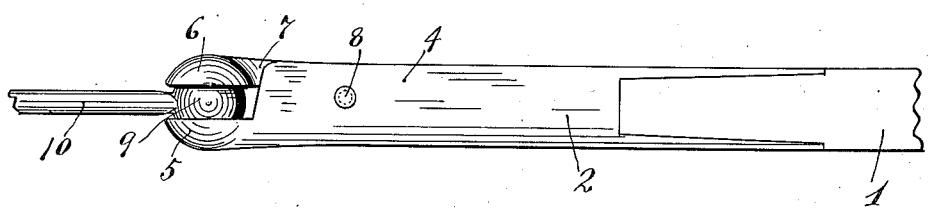
Figure 3:
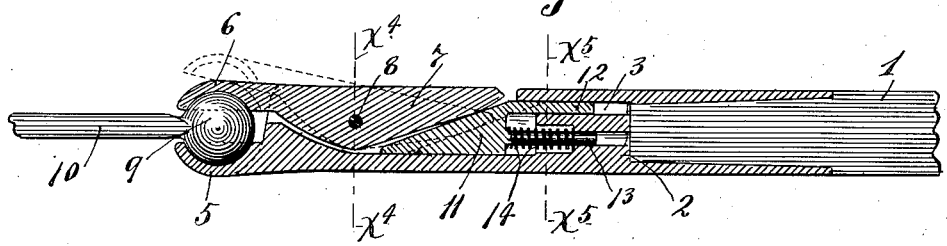
Figure 2:
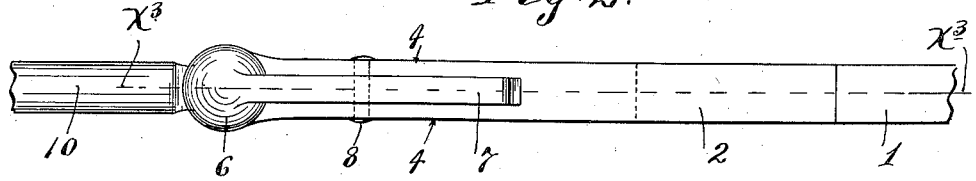
Figure 2:
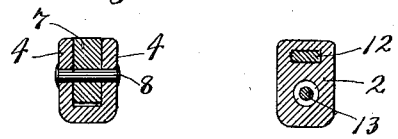

The invention is illustrated in the accompanying drawings, wherein like characters indicate like parts throughout the several views. Figure 1 is a side elevation showing a pitman-head, a portion of a pitman, and a part to which the pitman-head is coupled, the said pitman being designed in accordance with my invention. Fig. 2 is a plan view of the parts shown in Fig. 1. Fig. 3 is a vertical section taken approximately on the line $x^3 x^3$ of Fig. 2. Fig. 4 is a transverse section on the line $x^4 x^4$ of Fig. 3, and Fig. 5 is a section on the line $x^5 x^5$ of Fig. 3.

The numeral 1 indicates a pitman, to one end of which is rigidly secured a socket 2, which is formed with a plunger-seat 3 with side flanges 4 and with one member 5 of a pair of approximately semispherical ball seats or sockets, the other, the cooperating ball seat or socket 6, being formed on the forwardly-projecting end of a lever 7, which lever is pivoted by a pin 8 to the flanges 4 of the socket-like head 2. The said lever 7 is held against lateral movements by the flanges 4, but is free for pivotal movements, so as to engage and disengage the half-sockets 5 6 with the spherical head or ball 9 of a member 10, which is to be given reciprocating movements by the pitman.

Mounted to slide in the seat 3 of the head 2 is a so-called "take-up" wedge 11, the inclined face of which engages the inner end of the lever 7. As shown, the take-up wedge 11 is formed with a flange 12 and a stem 13, both of which telescope into suitable seats in the head 2. A coiled spring 14, placed on the stem 13 and compressed between the wedge 11 and the head 2, yieldingly forces said wedge into engagement with the lever 7. The bevel of the face of the wedge 11 is such that pressure thereon from the lever 7 cannot move the said wedge into a retracted position against friction and the tension of the spring 14. Hence it is evident that under the tension of its spring 14 the wedge 11 will be moved forward and outward, and acting on the lever 7 will take up all play due to wear and always maintain close engagement between the half sockets or seats 5 6 and the spherical head 9. Any play taken up by the wedge 11 will not be again let out, and hence pressure on the sockets 5 6 from the ball or head 9 will not cause the said sockets to separate. When it is desired to uncouple the head 9 from the sockets 5 6, the take-up wedge 11 must be positively forced into a retracted position by force applied directly thereto. This may be done by engaging the said wedge by a tool of proper form which is capable of being inserted into engagement therewith.

The device described while of small cost and extremely simple is efficient for the purposes had in view. The device described is of course capable of modification within the scope of my invention as herein set forth and claimed.

The pitman coupling or head while capable of general use is especially adapted for use to connect the pitmen of mowers and other agricultural machines to their reciprocating sickle-bars.

What I claim, and desire to secure by Letters Patent of the United States, is as follows:

1. The combination with the ball or journal, of a pair of cooperating socket members, one of which has a pivotal movement with respect to the other, and a spring-pressed take-up wedge operating on said socket members, to force them onto the said ball or journal, substantially as described.

2. The combination with a ball or head, of a pair of pivotally-connected socket members, and a spring-pressed take-up wedge operating on said socket members, which wedge, when in a retracted position, permits the removal of said head from between the socket members, substantially as described.

3. The combination with a member having a head 9, of a pitman having a head 2 formed with a wedge-seat 3 and with a half-socket 5, the lever 7 pivoted between the flanges of said head 2 on a pin 8 and formed with the half-socket 6, and the spring-pressed take-up wedge 11 mounted in said wedge-seat 3 and engaging the inner end of said lever 7, substantially as and for the purposes set forth.

In testimony whereof I affix my signature in presence of two witnesses.

OLOF A. JOHNSON

Witnesses:
 ROBERT C. MABEY,
 F. D. MERCHANT.